Aug. 21, 1928.
R. M. KIMBRO
1,681,643
ADJUSTABLE SEAT BACK FOR AUTOMOBILES
Filed Oct. 20, 1926
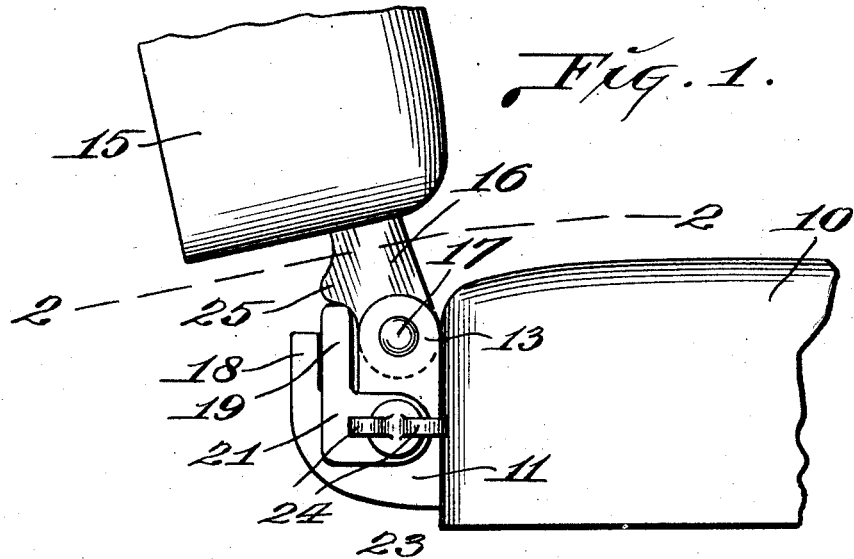
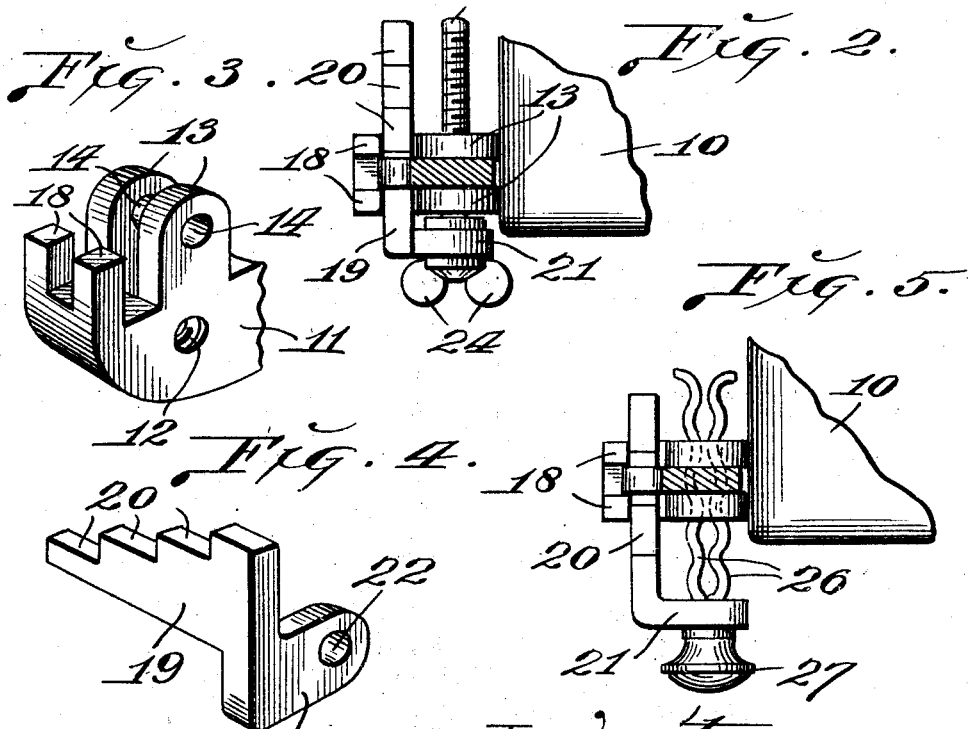
Inventor:—
Robert M. Kimbro.
By Martin P. Smith Atty.

Patented Aug. 21, 1928.

1,681,643

UNITED STATES PATENT OFFICE.

ROBERT M. KIMBRO, OF CALEXICO, CALIFORNIA.

ADJUSTABLE SEAT BACK FOR AUTOMOBILES.

Application filed October 20, 1926. Serial No. 142,836.

My invention relates to an adjustable seat back for automobiles and has for its principal object the provision of a relatively simple, practical and inexpensive hinge joint that forms a connection between the seat frame and seat back and which will permit the latter to be readily adjusted to various inclined positions so as to suit the individual wishes of the occupants of the seat, and which hinge joint, when properly manipulated, enables the seat back to be swung rearwardly and downwardly into the same horizontal plane with the seat body, in order to form a cushioned support that may be utilized as a bed.

Further objects of my invention are to provide a hinge joint of the character referred to that is very compact and which occupies an out-of-the-way position between the rear side of the seat body and the lower end of the seat back; further, to provide a hinge joint that may be very readily shifted from one position to another so as to secure proper adjustment of the supported seat back; and further, to provide an automobile seat back hinge joint that possesses superior advantages in point of simplicity, durability and general efficiency.

With the foregoing and other objects in view, my invention consists in certain novel features of construction and arrangement of parts that will hereinafter be more fully described and claimed and illustrated in the accompanying drawing, in which—

Fig. 1 is an elevational view of a portion of an automobile seat and its back and showing the same connected by an adjustable hinge joint of my improved construction.

Fig. 2 is a horizontal section taken approximately on the line 2—2 of Fig. 1.

Fig. 3 is a perspective view of that portion of the hinge joint that is secured to the frame of the seat base.

Fig. 4 is a perspective view of an adjustable plate that forms a part of my invention.

Fig. 5 is a plan view similar to Fig. 2 and showing a modified arrangement of the means employed for adjusting the position of the seat back supporting member of the device.

Referring by numerals to the accompanying drawings, which illustrate a practical embodiment of my invention, 10 designates an automobile seat body which may be of any desired construction and projecting rearwardly from the frame of said body adjacent to the ends thereof are blocks 11 of metal through which are formed horizontally disposed apertures 12 that are threaded.

Formed integral with and projecting upwardly from each block 11, above the aperture 12, are ears 13 that are provided with horizontally aligned perforations 14.

Depending from the frame of the seat back 15 that is associated with the seat 10 and adjacent to the ends of said seat back are short arms 16 that are arranged respectively between the pairs of ears 13 on blocks 11, and said arms are hinged to said ears 13 by means of hinged pins 17 that pass through the apertures 14 and through apertures in said arms 16.

Formed integral with the outer portion of each block 11 and spaced apart from the ears 13 are upwardly projecting lugs 18, the same being spaced apart a distance equal to the width of the space between ears 13. Occupying the space between the ears 13 and lugs 18 on each block is a transversely disposed plate 19, the upper portion of which is cut away to form a series of stepped shoulders 20.

Formed integral with the outer end of each plate 19 and arranged at right angles thereto is a depending plate 21 that overlies the corresponding face of block 11 and formed in said plate 20 in alignment with the threaded aperture 12 is an aperture 22. This aperture provides a bearing for the outer portion of a bolt or short rod 23, the greater portion of which is threaded in order that it may be screwed through the corresponding threaded aperture 12.

Formed on the outer end of each bolt or threaded rod is a pair of ears 24 that enable said bolt or rod to be readily manipulated. Obviously by engaging the ears 24 and rotating the bolts or rods 23, the latter may be moved inwardly or outwardly through the blocks 11, with the result that the stepped shoulders 20 will be successively brought into position in alignment with the arms 16 and the rear ridges of the latter adjacent to their pivot points are provided with rearwardly projecting lugs 25 that are adapted to rest on the stepped shoulders of the plates 19.

When the plates 19 are moved inward to their limits of movement, as illustrated in Fig. 2, the uppermost ones of the shoulders 20 are positioned in alignment with the arms 16 and the engagement of the lugs 25 on the uppermost shoulder firmly supports the seat back 15 in a substantially upright position.

When the stepped plates 19 are drawn outwardly by proper manipulation of the screw rods 23, so that the inner ends of said plates 19 are outside the vertical planes occupied by the arms 16, the seat back 15 may be swung downwardly into a substantially horizontal plane to cooperate with the seat body 10 in forming a bed bottom.

Obviously by adjusting the plates 19 so as to locate the intermediate stepped shoulders in line with the arms 16, the latter and the seat back 15 may be supported in various inclined or angular positions, thus providing a convenient and comfortable reclining seat back.

In order to provide a more rapid means of adjusting the stepped plates 19 that support the seat back in different positions, the screw rods 23 may be dispensed with and the corrugated legs of cotter pins 26 are adjustably mounted in the apertures 12 in blocks 11, and where such construction is employed, it is not necessary to thread said apertures 12. The outer portion of each corrugated cotter pin is seated in the corresponding plate 21 and that portion of the pin that projects beyond said plate carries a knob or head such as 27.

Where the construction just described is employed, the corrugated cotter pin is moved through the aperture in block 11 by inward pressure applied to the knob 27 or by an outward pull thereon, and the corrugations in the legs of the cotter pin engaging in the aperture 12 effectually retains the cotter pins and the stepped plates carried thereby in their adjusted positions.

Thus it will be seen that I have provided a readily adjustable hinge that is especially applicable as a connection between automobile seats and their backs, and which adjustable hinge is relatively simple in construction, inexpensive of manufacture, capable of being readily manipulated and which is very effective in performing the functions for which it is intended.

It will be understood that minor changes in the size, form and construction of the various parts of my improved adjustable hinge may be made and substituted for those herein shown and described without departing from the spirit of my invention, the scope of which is set forth in the appended claims.

I claim as my invention:

1. The combination with a seat and seat back, of a hinge member projecting rearwardly from the seat, a hinge member secured to the lower portion of the seat back and pivotally connected to the first mentioned hinge member, a stepped plate supported by and mounted for lateral adjustment upon the hinge member that projects from the seat, which stepped plate underlies the hinge member that is connected to the seat back and serves to support the same in differently adjusted positions, and a stepped plate bearing and support formed on the outer portion of the hinge member that projects from said seat.

2. The combination with a seat and seat back, of a hinge member projecting rearwardly from the seat, a hinge member projecting downwardly from the seat back and pivotally connected to the first mentioned hinge member, a member mounted for lateral adjustment on the hinge member that projects rearwardly from the seat, said adjustable member being positioned beneath the point of pivotal connection between the hinge members and a stepped plate carried by said adjustable member and which stepped plate is supported by the hinge member that projects from the seat and occupies a position beneath the hinge member that projects from the seat back.

In testimony whereof I affix my signature.

ROBERT M. KIMBRO.